June 13, 1939.  C. CONE  2,162,377
GLASS ANNEALING LEHR
Filed Nov. 26, 1934  2 Sheets-Sheet 1
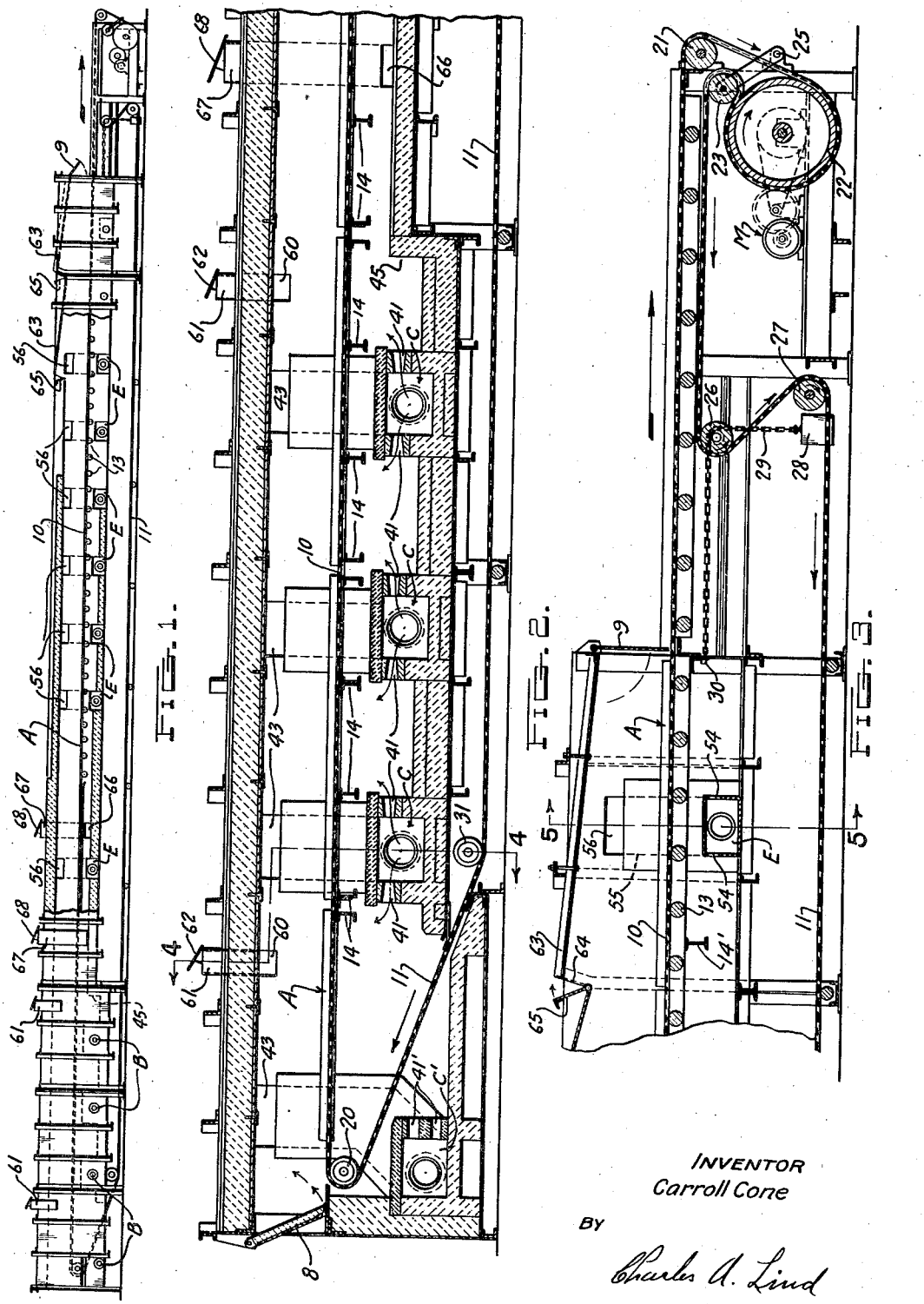
INVENTOR
Carroll Cone
BY
Charles A. Lind
ATTORNEY June 13, 1939.  C. CONE  2,162,377
GLASS ANNEALING LEHR
Filed Nov. 26, 1934   2 Sheets—Sheet 2

INVENTOR
Carroll Cone

BY
Charles A. Lind
ATTORNEY

Patented June 13, 1939

2,162,377

UNITED STATES PATENT OFFICE 2,162,377

GLASS ANNEALING LEHR

Carroll Cone, near Toledo, Ohio, assignor to Surface Combustion Corporation, Toledo, Ohio, a corporation of New York Application November 26, 1934, Serial No. 754,799

22 Claims. (Cl. 49—47)

This invention relates to improvements in continuous glass-annealing lehrs, the improvements having particular reference to means for producing uniform temperature gradients therein.

The function of a continuous lehr is to receive newly formed glassware at its charging end, subject this ware to a uniform soaking heat at annealing temperature for a length of time sufficient to substantially equalize the temperatures of all portions of the ware, and thereafter gradually to cool the ware at a predetermined rate to introduce a minimum of strain due to thermal contraction,—the ware in the meantime moving through the lehr tunnel on a conveyor traveling at constant speed from the charging to the discharging end of the lehr.

In order that all portions of the ware on the conveyor shall receive identical treatment during the annealing cycle, it is necessary that the temperatures at all points in any given cross section of the tunnel be maintained at a constant and uniform value. In order that all portions of a closely stacked load of ware shall conform to the desired temperature established in any portion of the tunnel through which the ware may be passing, it is further necessary that the rate of heat transfer between the ware and the atmosphere within the tunnel be artificially accelerated.

A further requirement in all lehrs used for annealing glass containers, table ware and the like is that the atmosphere within the tunnel shall contain no fumes tending to produce a visible "bloom" or deposit upon the glass, since such discoloration detracts from the commercial value of the product. This requirement has usually been met by enclosing the annealing tunnel in a gastight muffle, outside of which the products of combustion from a hydrocarbon fuel are circulated to apply the necessary heat. In some cases the lehr has been heated by electrical resistance elements to eliminate hydrocarbon fumes entirely.

In any lehr heated through a muffle or by electrical means, the atmosphere in which the ware is annealed is relatively stagnant, unless artificial circulating means are provided. The natural circulation, or convection of heat, is relatively slow and tends to stratify this atmosphere in layers of decreasing temperature from the top to the bottom of the lehr. This usually causes a condition in which the top of the tunnel is considerably hotter, throughout the entire length, than is the bottom, and in which the temperature gradients from end to end are difficult to control. The relatively stagnant atmosphere in the tunnel, furthermore, limits heat transfer rates, especially in the center of a mass of ware, to undesirably low values. Thus it will be seen that in a lehr of the usual design, the annealing cycles for ware at the top and bottom of the tunnel or at the periphery and center of a mass are necessarily different. The capacity of such a lehr is therefore seriously limited by the necessity of allowing sufficient time in the tunnel to anneal the ware receiving the least favorable treatment.

I have discovered that if fuel gas is burned in a special way, its products of combustion may be circulated while hot in direct contact with the glassware without producing a bloom or discoloration of any sort on the glassware. By thus heating the ware, the use of a muffle is unnecessary and a considerable saving in fuel is effected due to the lower temperature of the exhaust gases. The special way of burning the fuel gas is to mix it with its full complement of air and introduce the mixture under pressure into a refractory combustion tunnel for burning therein. The hot products of combustion issue from the combustion tunnel with considerable velocity and in accordance with the present invention I utilize the kinetic energy of the outflowing products of combustion to induce relatively rapid circulation of the atmosphere within the lehr tunnel. In order to obtain circulation of gases in the cooling portion of the tunnel, where no addition of heat is required, I introduce jets of air at atmospheric temperature and high velocity. By this system of heating and cooling, I have substantially eliminated the temperature stratification characteristic of a stagnant atmosphere and have accelerated the rate of heat transfer between the atmosphere and the ware sufficiently to insure a highly uniform temperature throughout the mass of the ware at any given cross section of the tunnel, and withal have produced a lehr which may be manufactured at relatively low cost as compared, for example, with muffle-type lehrs.

The various features of novelty and invention will more fully appear from the detailed description taken in connection with the accompanying drawings wherein the preferred form of the invention is shown.

Referring to the drawings,

Fig. 1 is a side elevation of the improved lehr with an intermediate portion of the near wall removed, the view being on the greatly reduced scale as compared with the other views;

Fig. 2 is a vertical longitudinal section of the heating portion of the lehr;

Fig. 3 is a vertical longitudinal section of the ware discharge end of the lehr;

Figure 6:
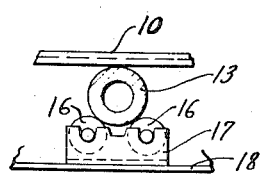
Fig. 6 is a fragmentary detail view of certain parts of the lehr.

The lehr is of tunnel-type, the ware-entering end being at the left as viewed in Fig. 1, the entrance thereto being controlled by an inwardly swinging flap door 8 and the outlet by an outwardly swinging flap door 9. The ware is moved through the tunnel on a platform A which extends the full length of the lehr at a level intermediate the roof and floor thereof. The platform is of open work construction to permit gases to pass freely therethrough from one side to the other. In its preferred form, the platform comprises a flat movable apron 10 which constitutes the upper portion of an endless wire-mesh belt conveyor 11. The apron may be supported wholly or in part on longitudinally extending skid rails 12 or on rollers 13 arranged crosswise of the tunnel. For illustrative purposes, skid rails are shown in the heating portion of the tunnel and for some distance there beyond and the rollers in the cooling portion, the skid rails being supported on a series of cross bars 14 which, in turn, are supported at their ends on shelves 15 secured to the side walls of the tunnel. The rollers may or may not be extended through the side walls of the tunnel and are preferably supported at their end on roller bearings each comprising a pair of axially spaced discs 16 rotatedly supported in a crade 17 (see Fig. 6),—the cradles being secured to longitudinally extending side rails 18 which, in turn, are supported by a series of cross bars 14' which are supported by the side walls of the tunnel in the same manner as the cross bars 14. Side plates 19 prevent sidewise displacement of the rollers 13 and the apron 10.

At opposite ends of the platform A are freely rotatable drums 20 and 21 over which the conveyor belt 11 is looped. The belt is driven by a relatively large diameter drum 22 which, in turn, is driven by suitable power mechanism M. The belt is wrapped almost entirely around the driving drum and just before it leaves the drum is pressed thereagainst by an idler 23 at the upper end of swingable links pivoted as at 25 to a stationary frame work. From the idler 23, the belt passes over a slidably supported idler 26 and thence to a lower idler 27. The idler 26 tends to move toward the left as viewed in Fig. 3 under the influence of weights 28 at one end of chains 29 which pass over the ends of the idler and are anchored to a stationary support as at 30, thereby taking up the slack between the two idlers 23 and 27 and tending to press the idler 23 against the driving drum. From the idler 27 the belt passes to an idler 31 adjacent to a slot in a tunnel floor through which it extends to the idler drum 20 at an angle whereby to insure that it shall be properly preheated before passing over the idler drum 20.

The lehr is heated by two rows of gas burners B and B', one row at each side, both rows having the same number of burners and being in a common level below the platform A.

Each burner comprises a refractory combustion tunnel 33 to which combustible mixture is supplied under pressure by a supply pipe 34 which terminates in a chambered head having a restricted discharge orifice at the inlet end of said tunnel, said mixture consisting of fuel gas admixed with its full complement of air, the air and gas being mixed by any suitable mixing and proportioning apparatus not shown. Since the fuel is mixed with its full complement of air it is highly explosive and burns with great rapidity in its combustion tunnel. Products of combustion produced by burning fuel gas in this manner have the peculiar property of not causing a bloom or discoloration on the glassware. The products of combustion flow from the combustion tunnel with considerable velocity and advantage is taken of this fact to effect circulation of the gases in the tunnel as presently explained.

Figure 4:
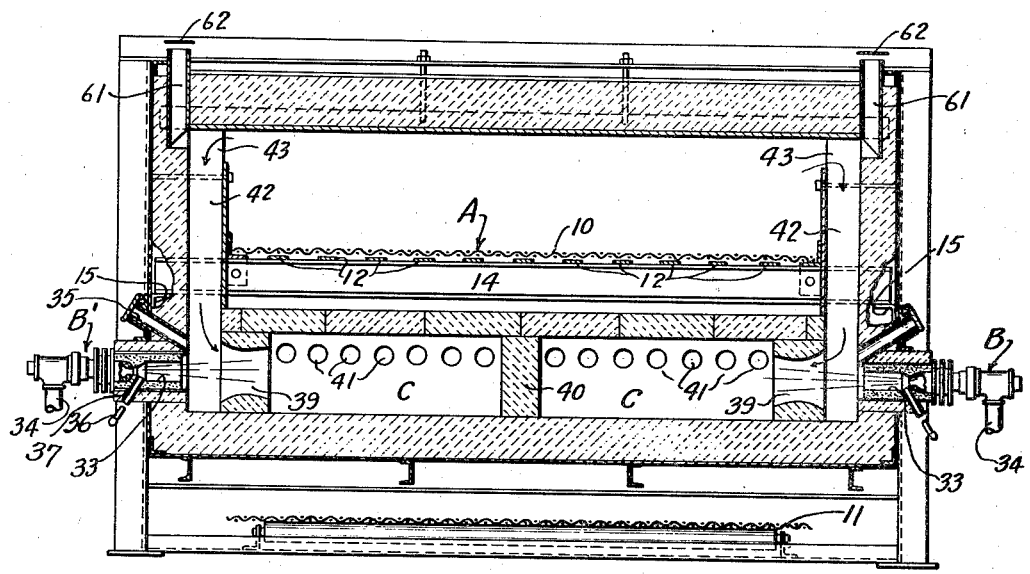
Fig. 4 is a vertical section on lines 4—4 of Fig. 2.
Figure 5:
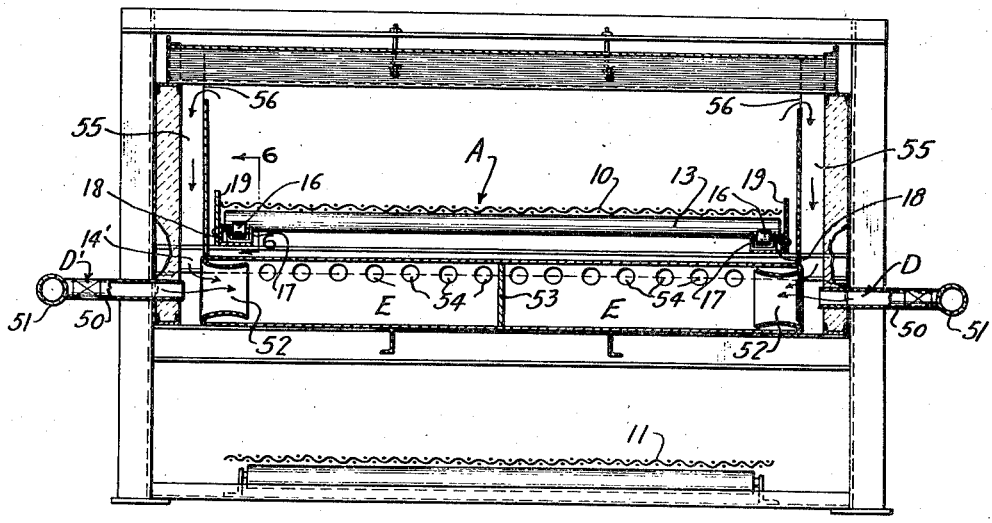
Fig. 5 is a vertical cross section on lines 5—5 of Fig. 3.

The burners may be ignited by inserting a flare through a normally closed passage 35 extending through the tunnel wall adjacent each burner or by a continuously burning pilot 36 set to discharge into a relatively restricted passage leading into the combustion tunnel 33, all as clearly shown in Fig. 4.

Directly opposite the various combustion tunnels 33 in spaced relation are throats 39 which constitute inlets to gas distributing chambers C which extend crosswise of the lehr tunnel and which are preferably divided midway their ends by a partition wall 40. The outlets from the chambers preferably comprise a row of holes or outlet ports 41 in the opposite sides thereof. The space between each throat and adjacent combustion tunnel constitutes the lower end of an upwardly extending duct 42 which at its upper end is open to the interior of the tunnel, as indicated at 43. Since the hot gases flow from the combustion tunnels 33 with considerable velocity, it will be readily appreciated that each of said tunnels functions in effect as a nozzle and that an entraining effect is produced in the lower end of each duct 42, thereby causing a down flow of gases in the various ducts from the upper portion of the lehr tunnel, these downwardly flowing gases entering the chambers C along with the hot gases from the combustion tunnels thereby partially cooling the hot gases and themselves becoming reheated.

When the various chambers C are divided midway their ends by a partition wall 40, it will be readily appreciated that it becomes possible to obtain different heat conditions in the two lateral halves of the lehr tunnel if such mode of operation is desired,—it being understood that each row of burners and each of the burners thereof may be individually and independently controlled by suitable valves in the individual fuel supply lines.

The walls forming the chambers C will ordinarily be made of heat insulating firebrick. It is however within the spirit of the invention to make the top walls of heat conducting refractory, as indicated by the difference in shading, whereby heat may be radiated to the underside of the platform A. The chamber C' at the front end of the lehr is to all intents and purposes like the other chambers except that its outlet ports 41' are formed in one side only, said side preferably being of heat conducting refractory whereby to radiate heat to the incoming portion of the belt 11.

The heating portion of the lehr may be considered as terminating at the step-up 45 in the floor of the tunnel, said step-up serving in effect as a baffle for the gases discharged from the near outlet ports 41 in the adjacent chamber C.

The cooling portion of the lehr is provided with two rows of nozzles D and D', one row at each side, both rows having the same number of nozzles and being in a common plane below the platform A. Each air nozzle conveniently comprises a short section of pipe 50, each row of nozzles being supplied with air under pressure by a supply pipe 51. Directly opposite the various air nozzles in spaced relation with respect thereto are throats 52 which constitute inlets to air distributing chambers E which extend crosswise of the lehr tunnel and which, like the chambers C, are preferably divided midway their ends by a partition wall 53. As in the case of the chambers C, the outlets from the chambers E preferably comprise a row of holes or outlet ports 54 in the vertical sides thereof. The space between each throat and the adjacent air nozzle constitutes the lower end of an upright duct 55, the upper end of which is in direct communication with the interior of the lehr tunnel as indicated at 56. It will be readily appreciated that the air discharged from the various nozzles 50 produces an entraining effect in the lower end of the various ducts 55 thereby causing gases or air in the upper portion of the tunnel to enter and flow downwardly in said ducts for mixing with the air discharged from the said nozzles. It will also be readily appreciated that since the various chambers E are divided midway their ends, the temperature conditions in the two lateral halves of the cooling portion of the tunnel may be more or less independently controlled.

Since heating and cooling gases are continuously flowing into the lehr tunnel, it is necessary to provide means for continuously venting some of the gases to the atmosphere as otherwise the pressure in the tunnel would become excessive with resultant strong outflow of gases from the opposite ends of the tunnel. The preferred venting system is hereinafter described.

Both side walls of the tunnel in the heating portion of the lehr are provided with a plurality of outlet ports 60 near the roof of the tunnel, the ports being in direct communication with damper controlled exhaust ducts 61, the dampers being indicated at 62. At the discharge end of the lehr, the tunnel roof is stepped-up as indicated at 63 to provide outlet ports 64 across the full width of the tunnel, the ports being controlled by swingable dampers 65. At an intermediate portion of the tunnel, both of its side walls are provided with outlet ports 66 near the floor of the tunnel, these ports being in direct communication with upright damper controlled ducts 67, the dampers being indicated at 68. The provision of outlet ports 66 below the platform and more particularly in that portion of the tunnel between the heating and cooling zones proper, effectively retards any appreciable flow of cooling gases toward the charge end of the lehr. As shown in Fig. 1 one of the air distributing chambers E is preferably located between the longitudinally spaced pair of outlet ports 66 and is considerably remote from the next nearest chamber E.

As already indicated each combustion chamber 33 also functions in effect as a hot-gas discharge nozzle. Consequently it will be readily appreciated that the products of combustion might be produced in apparatus independent of said chambers for delivery thereto through suitable conduits, the chambers in such event serving simply as discharge nozzles. An arrangement of this kind would be particularly desirable with fuels other than fuel gas, for example fuel oil.

From the foregoing description it will be readily appreciated that the present invention provides a lehr which is relatively simple in construction and well adapted for its intended use. It will of course also be understood that no limitations are intended except as may be expressed in the appended claims.

What I claim as new and desire to secure by Letters Patent is:

1. A glass annealing lehr comprising, in combination, a tunnel wherethrough the glassware is passed for annealing, an apertured ware-supporting platform above the floor of said tunnel, a group of nozzles along each side wall of the tunnel for a portion of the length of the latter for discharging heating gases into the tunnel, a second group of nozzles along said walls of another portion of the tunnel for discharging cooling gases into the tunnel, all of said nozzles being below the level of said platform, and means comprising an exhaust duct in direct communication with the tunnel below said platform and between the two groups of nozzles for venting gases from the tunnel.

2. A glass annealing lehr comprising, in combination, a tunnel wherethrough the glassware is passed for annealing, an apertured ware-supporting platform above the floor of said tunnel, a group of nozzles along the side walls of the tunnel for a portion of the length of the latter for discharging heating gases into the tunnel, a second group of nozzles along said walls of another portion of the tunnel for discharging cooling gases into the tunnel, the first group of nozzles being below the level of said platform, and ducts individual to the first group of nozzles for conducting gases from the space above said platform to the discharge end of such nozzles.

3. A glass annealing lehr comprising, in combination, a tunnel wherethrough the glassware is passed for annealing, an apertured ware-supporting platform above the floor of said tunnel, a group of nozzles in a row along the side walls of the tunnel for a portion of the length of the latter for discharging heating gases into the tunnel, a second group of nozzles along said walls of another portion of the tunnel for discharging cooling gases into the tunnel, the first group of nozzles being below the level of said platform, horizontally arranged apertured chambers individual to the first group of nozzles and whereinto the latter discharge, the inlet to the chambers being spaced from the discharge end of their respective nozzles whereby the gases discharged from the nozzles set up an entraining effect in crossing said space.

4. A glass annealing lehr comprising, in combination, a tunnel wherethrough the glassware is passed for annealing, an apertured ware-supporting platform above the floor of said tunnel, a group of nozzles in a row along the opposite side walls of the tunnel for a portion of the length of the latter for discharging heating gases into the tunnel, a second group of nozzles along another portion of the tunnel for discharging cooling gases into the tunnel, the first group of nozzles being below the level of said platform, ducts individual to the first group of nozzles for conducting gases from the space above said platform to the discharge end of such nozzles, horizontally arranged apertured chambers individual to the first group of nozzles and whereinto the latter discharge, the inlet to the chambers being spaced from their respective nozzles whereby the gases discharged from the latter set up an entraining effect in said ducts in crossing said space.

5. In combination, a tunnel having a ware-supporting platform therein, means for producing heat in the tunnel, said means including a pressure burner positioned in a side wall of the tunnel at a level below said platform, and a throat into which said burner discharges and which is separated from said burner by a gap which is open to the interior of the tunnel.

6. In combination, a tunnel having a ware-supporting platform therein, means for producing heat in the tunnel, said means including a pressure burner positioned in a side wall of the tunnel at a level below said platform, a throat into which said burner discharges and which is separated from said burner by a gap which is open to the interior of the tunnel, and a gas distributing chamber of which said throat constitutes the inlet and having outlet ports for the escape of gases into the tunnel.

7. In combination, a tunnel having a ware-supporting platform therein, means for producing heat in the tunnel, said means including a pressure burner positioned in a side wall of the tunnel at a level below said platform, a throat into which said burner discharges and which is separated from said burner by a gap, a gas distributing chamber below said platform and of which said throat constitutes the inlet and having outlet ports for the escape of gases into the tunnel, and a duct connecting the upper portion of said tunnel with said gap.

8. In combination, a tunnel having a ware-supporting platform therein, means for producing heat in the tunnel, said means including two alined gas distributing chambers extending between the sides of the tunnel below said platform and having outlet ports for the escape of gases into the tunnel, an inlet throat at one end of each chamber, a burner opposite each throat and discharging thereinto across an intervening gap, and a duct connecting each gap with the upper portion of the tunnel.

9. A glass annealing lehr comprising, in combination, a tunnel wherethrough the glassware is passed for annealing, an apertured ware-supporting platform above the floor of said tunnel, a group of burners for explosive mixture along each side wall of the tunnel for a portion of the length thereof for discharging heating gases into the tunnel, and a group of nozzles along said walls of another portion of the tunnel for discharging cooling gases into the tunnel, all of said burners being below the level of said platform.

10. A glass annealing lehr comprising, in combination, a tunnel wherethrough the glassware is passed for annealing, an apertured ware-supporting platform above the floor of said tunnel, a group of pressure burners along a side wall of the tunnel for a portion of the length of the latter for discharging heating gases into the tunnel, a group of nozzles along said wall of another portion of the tunnel for discharging cooling gases into the tunnel, and ducts individual to said burners for conducting tunnel gases to the discharge end of the respective burners.

11. A glass annealing lehr comprising, in combination, a tunnel wherethrough the glassware is passed for annealing, a group of pressure burners along a side wall of the tunnel for a portion of the length of the latter for discharging heating gases into the tunnel, horizontally arranged apertured chambers individual to said burners and whereinto the latter discharge, the inlet to the chambers being spaced from the discharge end of the burners whereby the gases discharged from the burners set up an entraining effect in crossing said space and said space being in open communication with the interior of the tunnel.

12. A glass annealing lehr comprising, in combination, a tunnel wherethrough the glassware is passed for annealing, an apertured ware-supporting platform above the floor of said tunnel, a group of nozzles in a row along the opposite side walls of the tunnel for a portion of the length of the latter, means for delivering explosive mixture to said nozzles for burning therein, said nozzles being below the level of said platform, ducts individual to said nozzles for conducting gases from the space above said platform to the discharge end of the respective nozzles, horizontally arranged apertured chambers individual to said nozzles and whereinto the latter discharge, the inlet to the chambers being spaced from the nozzles whereby the gases discharged from the nozzles set up an entraining effect in said ducts in crossing said space.

13. A glass annealing lehr comprising, in combination, a tunnel wherethrough the glassware is passed for annealing, a foraminous ware-supporting platform above the floor of said tunnel, a succession of nozzles along each side wall of the tunnel, means individual to a group of successive nozzles for discharging hot gases into the tunnel, means individual to the remainder of the nozzles for discharging cold gases into the tunnel, and means whereby the heating effect of the hot gases may be partly a direct radiation and partly a convection effect.

14. A glass annealing lehr comprising, in combination, a tunnel wherethrough the ware is passed for annealing, a ware-supporting platform above the floor of said tunnel, a series of laterally spaced elongate recirculation chambers extending crosswise of the tunnel and having heat-conducting refractory tops, and means for introducing highly heated gases into said chambers, the latter having side outlets for the escape of said gases into the tunnel and being arranged below said platform.

15. A glass annealing lehr comprising a tunnel, an endless conveyor extending through said tunnel, a plurality of chambers extending transversely of said tunnel and positioned between said conveyor and the bottom thereof and arranged to diffuse heating gases longitudinally of the tunnel; means to radiate heat from the heating gases in the chambers to the non-ware-bearing side of said conveyor; the return strand of said conveyor passing from the outside of said tunnel between two of said chambers to receive the heating gases on both sides thereof and to receive radiated heat on its ware bearing side from the heating gas in one of said chambers.

16. A glass annealing lehr comprising a tunnel, a perforate ware support between the top and bottom thereof, means comprising a high velocity explosive mixture nozzle arranged to heat said tunnel by the direct combustion of fuel therein, and a plurality of vents for said tunnel opening at different elevations thereinto from the side walls, and ducts opening into the top and bottom of the tunnel at said nozzles.

17. A glass annealing lehr comprising a tunnel, a perforate ware bearing platform in said tunnel, a chamber under said platform having an inlet at one end thereof and having discharge openings in its side walls facing the longitudinal extent of said tunnel, and means for directing a velocity fluid through said inlet for entraining gases from the top of said tunnel and discharging them in admixture with said velocity fluid from the discharge openings of said chamber for diffusion into the tunnel.

18. In combination, a tunnel wherethrough glass may be passed for annealing, a perforate support for the glass above the bottom of the tunnel, and means for heating a portion of said tunnel comprising a plurality of recirculation chambers which extend transversely of the tunnel beneath said perforate support and which have ports opening longitudinally into the tunnel, means for discharging hot gases into said chambers, and means for discharging cool gases into the cooling portion of the tunnel.

19. In a glassware annealing lehr, a tunnel wherethrough the glassware is passed for annealing, an openwork ware-supporting platform above the floor of said tunnel, a group of nozzles in a row extending longitudinally of the tunnel for a portion of the length of the latter for discharging heating gases into the tunnel, a second group of nozzles along another portion of the tunnel for discharging cooling gases into the tunnel, the first group of nozzles being below the level of said platform, and covered passages into which the individual nozzles of the first group discharge their gases across intervening gaps, said passages having openings into the tunnel and said gaps being in communication with the interior of the tunnel, whereby the gases discharged from the first group of nozzles set up entraining effects causing a recirculation of gases into the tunnel.

20. In a glassware annealing lehr, the combination of a tunnel having an openwork ware-supporting platform therein, means for producing heat in the tunnel, said means including a pressure burner discharging into said tunnel at a level below said platform, and a throat into which said burner discharges and which is separated from said burner by a gap which is open to the interior of the tunnel.

21. In a glass annealing lehr, the combination of a tunnel having an openwork ware-supporting platform therein, and means for forming a heating zone in said tunnel comprising a series of covered passageways extending below said platform substantially transversely of the tunnel for a substantial portion of the longitudinal extent of the tunnel and having openings for the escape of gases into the tunnel, and pressure burners individual to and discharging into said passageways.

22. A glass annealing lehr, comprising in combination a tunnel wherethrough the glassware is passed for annealing, an openwork ware-supporting platform above the floor of said tunnel, a succession of nozzles arranged longitudinally of the tunnel below the platform, a passage associated with each nozzle and into which said nozzle discharges heating gases and from which said gases are delivered into the tunnel, said passages having their tops formed of heat conducting material, whereby the heat of the hot gases is transmitted to the glassware partly by radiation and partly by convection.

CARROLL CONE.